United States Patent
Wu

(10) Patent No.: US 9,628,781 B2
(45) Date of Patent: Apr. 18, 2017

(54) DISPLAY DEVICE

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 330 days.

(21) Appl. No.: 14/354,805

(22) PCT Filed: Dec. 17, 2013

(86) PCT No.: PCT/CN2013/089629
§ 371 (c)(1),
(2) Date: Apr. 28, 2014

(87) PCT Pub. No.: WO2015/024345
PCT Pub. Date: Feb. 26, 2015

(65) Prior Publication Data
US 2016/0080730 A1      Mar. 17, 2016

(30) Foreign Application Priority Data

Aug. 20, 2013   (CN) .......................... 2013 1 0364309

(51) Int. Cl.
*G02B 27/22* (2006.01)
*H04N 13/04* (2006.01)

(52) U.S. Cl.
CPC ..... *H04N 13/0409* (2013.01); *G02B 27/2214* (2013.01); *H04N 13/042* (2013.01); *H04N 2013/0463* (2013.01)

(58) Field of Classification Search
CPC ............. H04N 13/0409; H04N 13/042; G02B 27/2214
See application file for complete search history.

(56) References Cited

U.S. PATENT DOCUMENTS 5,831,765 A * 11/1998 Nakayama ........ G02F 1/133504
348/E13.022
2005/0111100 A1     5/2005 Mather et al.
(Continued)

FOREIGN PATENT DOCUMENTS

CN         101093631 A     12/2007
CN         101256245 A      9/2008
(Continued)

OTHER PUBLICATIONS

Third Office Action regarding Chinese application No. 201310364309.4, dated Nov. 27, 2015. Translation provided by Dragon Intellectual Property Law Firm.
(Continued)

*Primary Examiner* — Abbas Abdulselam
(74) *Attorney, Agent, or Firm* — Harness, Dickey & Pierce, P.L.C.

(57) ABSTRACT

A display device comprises a display panel, a driving module coupled to the display device, a parallax baffle arranged at a light-entering side or a light-exiting side of the display panel, and at least one reflective plate arranged outside at least one edge of the display panel. The display panel comprises a plurality of display units, the driving module is configured to drive the plurality of display units of the display panel to display a plurality of images, the parallax baffle is configured to display the plurality of images displayed by the plurality of display units at a plurality of predetermined visual areas, respectively, and the at least one reflective plate is configured to reflect the image displayed at the visual area adjacent to the reflective plate to other predetermined visual area.

19 Claims, 5 Drawing Sheets

(56) References Cited

U.S. PATENT DOCUMENTS

2007/0063941 A1    3/2007  Tanaka
2014/0267388 A1*   9/2014  Smyth ................... G06F 3/014
                                                      345/629

FOREIGN PATENT DOCUMENTS

| CN | 101900884 A | 12/2010 |
|----|-------------|---------|
| CN | 101925386 A | 12/2010 |
| CN | 201673311 U | 12/2010 |
| CN | 202008551 U | 10/2011 |
| CN | 102236201 A | 11/2011 |
| CN | 102354071 A | 2/2012  |
| CN | 202330954 U | 7/2012  |
| CN | 102654994 A | 9/2012  |
| CN | 103246076 A | 8/2013  |

OTHER PUBLICATIONS

Chinese Office Action dated Jan. 20, 2015 regarding Application No. 2013103643094, filed Aug. 20, 2013. Translation provided by Dragon Intellectual Property Law Firm.
Office Action regarding Chinese application No. 201310364309.4, dated Jul. 8, 2015. Translation provided by Dragon Intellectual Property Law Firm.
Written Opinion of the International Searching Authority for international application No. PCT/CN2013/089629.

* cited by examiner

DISPLAY DEVICE

CROSS-REFERENCE TO RELATED APPLICATION

This application is the U.S. national phase of PCT Application No. PCT/CN2013/089629 filed on Jun. 3, 2014, which claims priority to Chinese Patent Application No. 201310364309.4 filed on Aug. 20, 2013, the disclosures of which are incorporated in their entirety by reference herein.

TECHNICAL FIELD

The present invention relates to the field of display technology, in particular to a display device.

BACKGROUND

A dual-field display device can display different images at different angles of an identical screen, and present them to viewers at different angles of the display device, respectively. Currently, a parallax baffle method is the most common technology to achieve dual-field display, and as shown in FIG. 1, the display device comprises a display panel 10, and a slit grating 20 located above the display panel 10. The slit grating 20 is an optical element with transparent stripes and light-shielding stripes periodically arranged at a regular interval.

A principle of the dual-field display is that the viewer at a left visual area 301 of the display device can only see parts of pixels at the display panel 10 (the pixels shown by hatched portions in FIG. 1) through the slit gating 20, the viewer at a right visual area 302 of the display device can only see the other parts of the pixels at the display panel 10 (the pixels shown by no-hatched portions in FIG. 1), and signals of different images are input into the pixels which can be seen by the viewer at the left visual area 301 and the pixels which can be seen by the viewer at the right visual area 302, respectively. As a result, it is able to achieve the dual-field display effect.

For the dual-field display device, the viewer at the left visual area 301 can only see the images displayed at the left visual area 301, the viewer at the right visual area 302 can only see the images displayed at the right visual area 302, and a size of the image seen by the respective viewer is identical to a size of the display panel 10. However, when the display panel 10 is small, the size of the displayed image is small too. As a result, the comfort level and experience of a user is reduced when viewing the displayed image.

SUMMARY

An embodiment of the present invention provides a display device so as to achieve wide-screen display, thereby to improve the comfort level and experience of a user when viewing the displayed image.

In order to achieve the above-mentioned object, an embodiment of the present invention provides a display device, comprising a display panel, a driving module coupled to the display device, a parallax baffle arranged at a light-entering side or a light-exiting side of the display panel, and at least one reflective plate arranged outside at least one edge of the display panel. The display panel comprises a plurality of display units, the driving module is configured to drive the plurality of display units of the display panel to display a plurality of images, the parallax baffle is configured to display the plurality of images displayed by the plurality of display units at a plurality of predetermined visual areas, respectively, and the at least one reflective plate is configured to reflect the image displayed at the visual area adjacent to the reflective plate to other predetermined visual area.

Alternatively, in the display device, the plurality of display units comprise a plurality of first display units and a plurality of second display units periodically arranged at a regular interval, the driving module is configured to drive the plurality of first display units of the display panel to display a first image and drive the plurality of second display units of the display panel to display a second image, and the parallax baffle is configured to display the first image at a left visual area and display the second image at a right visual area. The display device comprises merely one reflective plate, which is arranged outside an edge of the display panel adjacent to the right visual area and configured to reflect the second image displayed at the right visual area to the left visual area. The first image displayed at the left visual area and a mirror image of the second image reflected to the left visual area form a complete image.

Alternatively, the parallax baffle is a slit grating.

Alternatively, when one display unit corresponds to one subpixel, a period of the slit grating corresponds to approximately two display units, and the opening portion of the slit grating corresponds to a junction, or a position in the vicinity thereof, between the first display unit and the second display unit.

Alternatively, in the display device, the plurality of display units comprise a plurality of first display units and a plurality of second display units periodically arranged at a regular interval, the driving module is configured to drive the plurality of first display units of the display panel to display a first image and drive the plurality of second display units of the display panel to display a second image, and the parallax baffle is configured to display the first image at a left visual area and display the second image at a right visual area. The display device comprises merely one reflective plate, which is arranged outside an edge of the display panel adjacent to the left visual area and configured to reflect the first image displayed at the left visual area to the right visual area. The second image displayed at the right visual area and a mirror image of the first image reflected to the right visual area form a complete image.

Alternatively, in the display device, the plurality of display units comprise a plurality of first display units and a plurality of second display units periodically arranged at a regular interval, the driving module is configured to drive the plurality of first display units of the display panel to display a third image and drive the plurality of second display units of the display panel to display a fourth image, and the parallax baffle is configured to display the third image at a middle visual area, and display the fourth image at a left visual area and a right visual area, respectively. The display device comprises two reflective plates, which are arranged outside an edge of the display panel adjacent to the left visual area and outside an edge of the display panel adjacent to the right visual area, respectively, and configured to reflect the fourth image displayed at the left visual area and the right visual area, respectively, to the middle visual area. The third image displayed at the middle visual area and at least a part of a mirror image of the fourth image reflected from the reflective plates adjacent to the left visual area and the right visual area to the middle visual area form a complete image.

Alternatively, when one display unit corresponds to one subpixel, a period of the slit grating corresponds to approximately two display units, and the opening portion of the slit grating corresponds to one display unit.

Alternatively, in the display device, the plurality of display units comprise a plurality of first display units, a plurality of second display units and a plurality of third display units arranged sequentially and circularly, the driving module is configured to drive the plurality of first play units of the display panel to display a fifth image, drive the plurality of second display units of the display panel to display a sixth image, and drive the plurality of third display units of the display panel to display a seventh image, and the parallax baffle is configured to display the fifth image at a middle visual area, display the sixth image at a left visual area, and display the seventh image at a right visual area. The display device includes two reflective plates, which are arranged outside an edge of the display panel adjacent to the left visual area and outside an edge of the display panel adjacent to the right visual area, and configured to reflect the sixth image displayed at the left visual area and the seventh image displayed at the right visual area to the middle visual area, respectively. The fifth image displayed at the middle visual area, a mirror image of the sixth image and a mirror image of the seventh image which are reflected from the reflective plates adjacent to the left visual area and the right visual area to the middle visual area, respectively, form a complete image.

Alternatively, a period of the slit grating corresponds to three display units and a center line of the opening portion of the slit grating is substantially coincide with a center line of a set of display units.

Alternatively, in the display device, the reflective plate is vertically arranged outside at least one edge of the display device.

Alternatively, in the display device, the parallax baffle is a liquid crystal grating or a grating made of an electrochromic material.

Alternatively, in the display device, the display panel is a liquid crystal display panel. The display device further comprises a backlight source.

Alternatively, in the display device, the display panel may also be an organic light-emitting diode (OLED) display panel.

According to the display device of the present invention, the reflective plate may reflect the image displayed at the visual area adjacent to the reflective plate to other visual area, so a viewer at the other visual area not only can see the image at the visual area where the view is located but also can see, through the reflective plate, the image at the visual area adjacent to the reflective plate. The image directly seen by the viewer at the visual area where the viewer is located is an image displayed by the whole display panel at the visual area, while the image seen through the reflective plate is also an image displayed by the whole display panel at the visual area adjacent to the reflective plate. As a result, when the driving module is controlled so as to enable the viewer to merely see a part of the complete image at the visual area where the viewer is located and to see the other part of the complete image through the reflective plate, it is equivalent to extending a length of the display panel, thereby it is able to achieve the wide-screen display of the image.

BRIEF DESCRIPTION OF THE DRAWINGS

In order to make the technical solutions of the present invention and the prior art more apparent, the present invention and the prior art are described hereinafter in conjunction with the drawings. Obviously, the drawings merely refer to some embodiments of the present invention, and a person skilled in the art, without any creative effort, may obtain the other drawings according to those mentioned hereinafter.

FIG. 3a is a view showing an image during the wide-screen display of the display device in Example 1 according to an embodiment of the present invention;

FIG. 3b is a view showing an image seen by a viewer, located at a left visual area, from the left visual area of the display device in Example 1 according to an embodiment of the present invention;

FIG. 3c is a view showing an image seen by the viewer, located at the left visual area, from a reflective plate of the display device in Example 1 according to an embodiment of the present invention;

FIG. 3d is a view showing an image seen by a viewer, located at a right visual area, from the right visual area of the display device in Example 1 according to an embodiment of the present invention;

Figure 1:
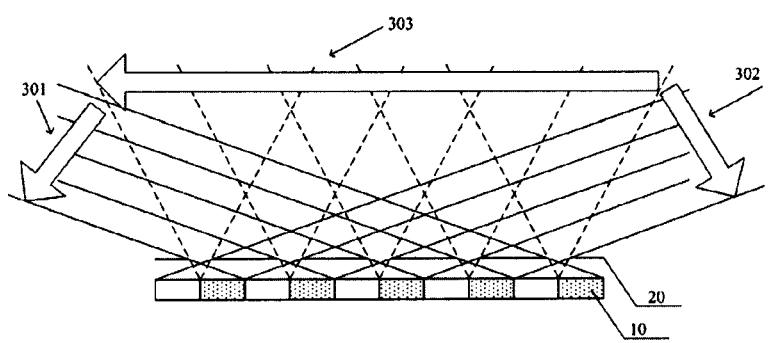
FIG. 1 is a view showing a principle of dual-field display according to the prior art.

REFERENCE NUMERALS 10 display panel
101 first display unit
102 second display unit
103 third display unit
20 slit grating
201 light-shielding portion 202 opening portion
301 left visual area
302 right visual area
303 middle visual area
40 driving module
50 reflective plate

DETAILED DESCRIPTION

The technical solutions of the present invention will be described hereinafter in conjunction with the drawings and the embodiments. Obviously, the followings are merely a part of, rather than all, the embodiments of the present application, and based on these embodiments, a person skilled in the art can obtain, without any creative effort, the other embodiments, which shall also be considered as falling within the scope of the present invention.

An embodiment of the present invention provides a display device, comprising a display panel 10, a driving module 40 coupled to the display panel 10, a parallax baffle arranged at a light-entering side or a light-exiting side of the display panel 10, and at least one reflective plate 50 arranged outside at least one edge of the display panel 10.

The display panel 10 at least comprises a plurality of first display units 101 and a plurality of second display units 102.

The driving module 40 is at least configured to drive the plurality of first display units 101 and the plurality of second display units 102 of the display panel 10 to display images, respectively.

The parallax baffle is at least configured to display images displayed by the plurality of first display units 101 and images displayed by the plurality of second display units 102 at predetermined visual areas, respectively.

The at least one reflective plate 50 is configured to reflect image displayed at the visual area adjacent to the reflective plate 50 to the other predetermined visual areas.

In this embodiment, the parallax baffle, for example, may be a slit grating 20 comprising a light-shielding portion 201 and an opening portion 202. The light-shielding portion 201 and the opening portion 202 are periodically arranged at a regular interval, i.e., one light-shielding portion 201 and an adjacent opening portion 202 form a period of the slit grating 20. Here, the images displayed by the first display unit 101 and the second display unit 102 may be defined at the desired visual areas by, for example, appropriately setting lengths of the light-shielding portion 201 and the opening portion 202 of the slit grating 20, a corresponding relationship between the opening portion 202 and the display units of the display panel 10, and a distance from the slit grating 20 to the light-entering side or the light-exiting side of the display panel 10. The slit grating has a relatively simple structure, and a thickness of the display device will be less affected by the slit grating. As a result, it is able to achieve a light and thin display panel.

It is to be noted that, firstly, in this embodiment, one display unit of the display panel 10 may be a subpixel, or a pixel consisting of three subpixels, or a plurality of pixels adjacent to each other, which will not be limited herein.

Secondly, in this embodiment, the parallax baffle may be a member capable of displaying the images displayed by the plurality of first display units 101 and the images displayed by the plurality of second display units 102 at the predetermined visual areas, respectively. It may not be limited to the slit grating 20, and examples of the other parallax baffle may further include a liquid crystal grating and a grating made of an electrochromic material.

Thirdly, the at least one reflective plate 50 is arranged outside at least one edge of the display panel 10. The expression "arranged outside one edge" means that the reflective plate 50 is arranged next to one side of the display panel 10.

Fourthly, the at least one reflective plate 50 is configured to reflect the image displayed at the visual area adjacent to the reflective plate 50 to the other predetermined visual areas, i.e., if the reflective plate 50 is arranged adjacent to a certain visual area, it reflects the image displayed at this visual area to the other visual areas, other than this visual area, where the image is desired to be seen. The reflective plate 50 may reflect the image displayed at the visual area close thereto to a specific visual area by appropriately setting an angle of the reflective plate 50, which will not be described herein.

Because the reflective plate 50 may reflect the image displayed at the visual area adjacent to the reflective plate 50 to the other visual areas, the viewers at the other visual areas not only can see the image at the visual area where the viewer is located, but also can see the image reflected by the reflective plate 50. As a result, when the driving module 40 is controlled to enable the viewer to merely see a part of a complete image at the visual area where the viewer is located and to see the other part of the complete image through the reflective plate 50, it is equivalent to extend a length of the display panel, thereby it is able to achieve the wide-screen display of the image.

Figure 2:
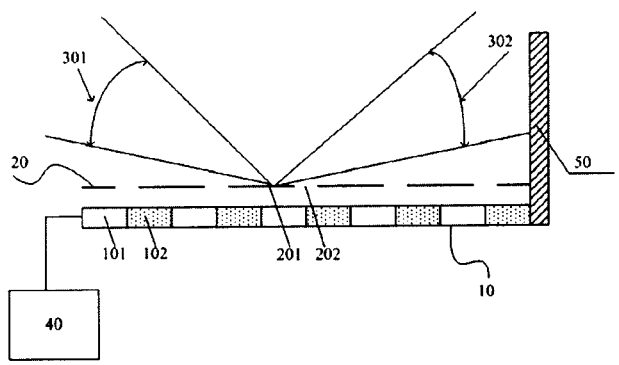
FIG. 2 is a first schematic view showing a display device according to an embodiment of the present invention.

Alternatively, as shown in FIG. 2, the display panel 10 includes a plurality of first display units 101 and a plurality of second display units 102. The plurality of first display units 101 and the plurality of second display units 102 are periodically arranged at a regular interval.

The driving module 40 is configured to drive the plurality of first display units 101 of the display panel 10 to display a first image and drive the plurality of second display units 102 of the display panel 10 to display a second image.

The parallax baffle is configured to display the first image at a left visual area 301 and display the second image at a right visual area 302.

Referring to FIG. 2, when the parallax baffle is the slit grating 20 and one display unit corresponds to one subpixel, a period of the slit grating 20 may correspond to approximately two display units, and the opening portion 202 of the slit grating 20 may correspond to a junction, or a position in the vicinity thereof, between the first display unit 101 and the second display unit 102, such that the viewer at the left visual area 301 can see the first image displayed by the plurality of first display units 101 and the viewer at the right visual area 302 can see the second image displayed by the plurality of second display units 102.

The display device comprises one reflective plate 50, which is arranged outside an edge of the display panel 10 adjacent to the right visual area 302 and configured to reflect the second image displayed at the right visual area 302 to the left visual area 301.

The first image displayed at the left visual 301 and a mirror image of the second image reflected to the left visual area 301 form a complete image.

Here, the first image and the mirror image of the second image form the complete image, i.e., the first image and the mirror image of the second image are simply combined together through human eyes, so as to visually see a complete, clear image. For example, if a complete picture is tore apart in the middle, one half thereof may be considered as the first image, and the other half may be considered as the mirror image of the second image. These two halves, if without any rotation, may be combined together so as to form a complete picture.

The first and second images seen by the viewers at the left visual area 301 and the right visual area 302 are both displayed at the whole display panel. When the viewer at the left visual area 301 not only can see the first image displayed at the whole display panel from the left visual area 301 but also can see, through the reflective plate 50, the second image displayed by the whole display panel that should have merely been seen from the right visual area 302 and when the first image and the mirror image of the second image form the complete image, the viewer at the left visual area 301 may see the complete image consisting of the first image and the mirror image of the second image from a screen with a size being double a size of the display panel, thereby it is able to achieve the wide-screen display.

Figures 3A, 3B, 3C, 3D:
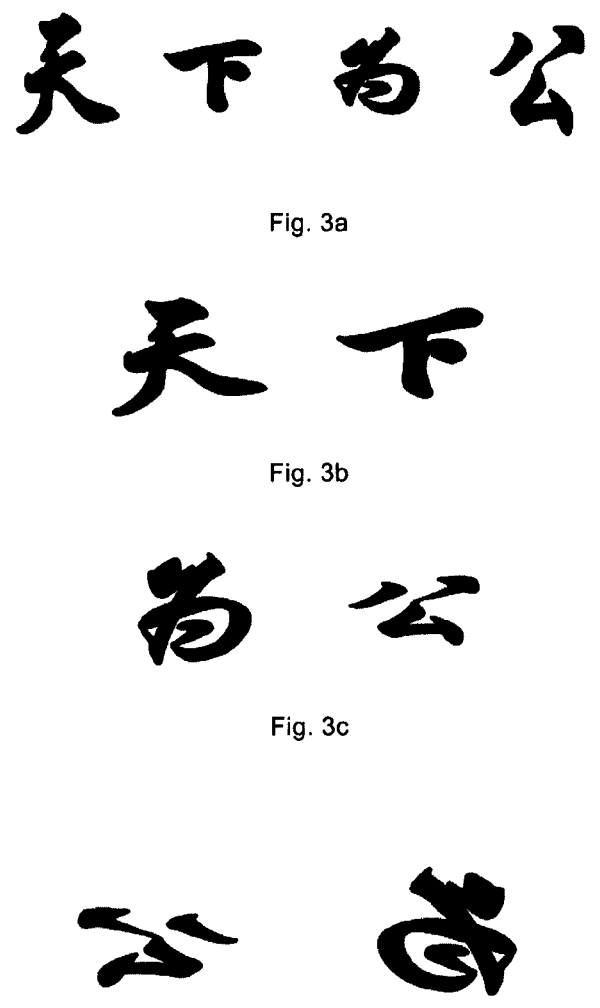

The structure of the display device capable of achieving the wide-screen display and the principle thereof will be described in Example 1 according to an embodiment of the present invention, so that the viewer located at the left visual area 301 can see the image as shown in FIG. 3a.

Referring to FIG. 2, the display device comprises the display panel 10, the driving module 40 coupled to the display panel 10, the slit grating 20 arranged at the light-exiting side of the display panel 10, and the reflective plate 50 arranged outside an edge of the display panel 10 adjacent to the right visual area 302.

The display panel 10 includes a plurality of first display units 101 and a plurality of second display units 102, the plurality of first display units 101 and the plurality of second display units 102 are periodically arranged at a regular interval. Here, one display unit corresponds to one subpixel.

The slit grating 20 is configured to display the image displayed by the first display units 101 at the left visual area 301 and display the image displayed by the second display units 102 at the right visual area 302.

Here, the image as shown in FIG. 3a may be divided into two parts, i.e., Chinese characters "天下" and "为公" as shown in FIGS. 3b and 3c. Chinese characters "天下" is displayed at the left visual area and Chinese characters "为公" is displayed at the right visual area 302 through the slit grating 20. After "为公" is reflected to the left visual 301 through the reflective plate 50 arranged outside the edge adjacent to the right visual area 302, the viewer at the left visual area 301 will see a mirror image of "为公", as shown in FIG. 3d. As a result, the viewer at the left visual area 301 will see an image obtained by combining the images as shown in FIGS. 3b and 3d, rather than a complete, clear image.

Figure 3E:
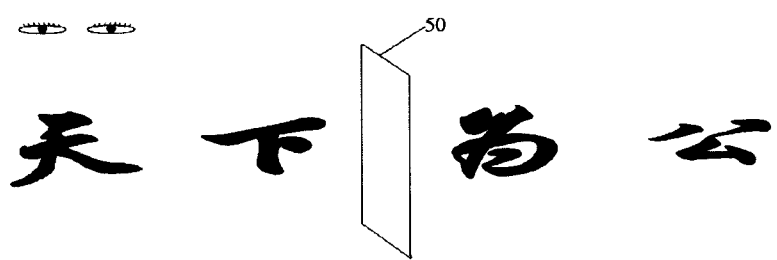
FIG. 3e is a view showing a complete image seen by the viewer, located at the left visual area, from the left visual area and the reflective plate of the display device in Example 1 according to an embodiment of the present invention.

Hence, in order to ensure the viewer at the left visual area 301 to see a complete, clear image, i.e., a Chinese idiom "天下为公" in a normal order as shown in FIG. 3e, it is required to ensure the viewer at the left visual area 301 to see "为公" as shown in FIG. 3c from the reflective plate. However, "为公" is seen after being mirrored, so before being mirrored, it corresponds to a mirror image of "为公" as shown in FIG. 3d that is seen by the viewer at the right visual area 302. As a result, it is required to drive the second display units 102, by the driving module 40, to display the mirror image of "为公" as shown in FIG. 3d, and correspondingly, the viewer at the right visual area 302 always see the mirror image.

Based upon the above, in the Example, the driving module 40 is configured to drive the plurality of first display units 101 of the display panel 10 to display the first image, i.e., "天下" as shown in FIG. 3b, and drive the plurality of second display units 102 of the display panel 10 to display the second image, i.e., the mirror image of "为公" as shown in FIG. 3d.

The slit grating 20 is configured to display the first image, i.e., "天下" as shown in FIG. 3b, at the left visual area 301, and display the second image, i.e., the mirror image of "为公" as shown in FIG. 3d, at the right visual area 302.

Here, when one display unit corresponds one subpixel, the period of the slit grating 20 corresponds to approximately two display units, and the opening portion 202 of the slit grating 20 corresponds to the junction, and a position in the vicinity thereof, between the first display unit 101 and the second display unit 102, so that the viewer at the left visual area 301 can see the first image displayed by the plurality of first display units 101, i.e., "天下" as shown in FIG. 3b, and the viewer at the right visual area 302 can see the second image displayed by the plurality of second display units 102, i.e., the mirror image of "为公" as shown in FIG. 3d. In addition, according to such corresponding relationship between the slit grating and the display panel 10, there will certainly be a cross-talk area between the left visual area 301 and the right visual area 302. In this Example, the viewer does not see the image at the cross-talk area, so it will not be taken into consideration.

It is to be noted that, the way of how to divide, by the driving module 40, a complete image into two parts, thereby to display a part of the image by the first display unit 101 and display the mirror image of the other part by the second display unit 102 will not be defined herein, and it may be set arbitrarily according to the actual situation.

Of course, the reflective plate 50 may also be arranged outside an edge of the display panel 10 adjacent to the left visual area 301, so that the viewer at the right visual area 302 not only can see the second image displayed at the whole display panel from the right visual area 302, but also can see, through the reflective plate 50 the first image displayed at the whole display panel that should have only been seen from the left visual area 301. As a result, the viewer at the right visual area 302 see the complete image consisting of the second image and the mirror image of the first image from a screen with a size being double a size of the display panel.

It should be noted that, in the case that the display panel 10 at least includes the plurality of first display units 101 and the plurality of second display units 102 and that they are arranged in a fixed order, a person skilled in the art, without any creative effort, can define the images displayed by the first display units 101 and the second display units 102 at the desired visual areas by appropriately setting lengths of the light-shielding portion 201 and the opening portion 202 of the slit grating 20, a corresponding relationship between the opening portion 202 and the display units of the display panel 10, and a distance from the slit grating 20 to the light-exiting side of the display panel 10.

Figure 4:
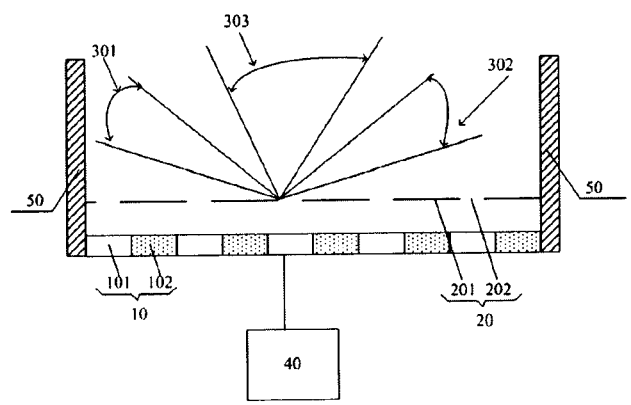
FIG. 4 is a second schematic view showing the display device according to an embodiment of the present invention.

Alternatively, as shown in FIG. 4, the display panel 10 includes a plurality of first display units 101 and a plurality of second display units 102, and the plurality of first display units 101 and the plurality of second display units 102 are periodically arranged at a regular interval.

The driving module 40 is configured to drive the plurality of first display units 101 of the display panel 10 to display a third image and drive the plurality of second display units 102 of the display panel 10 to display a fourth image.

The parallax baffle is configured to display the third image at a middle visual area 303, and display the fourth image at the left visual area 301 and the right visual area 302, respectively.

Here, referring to FIG. 4, when the parallax baffle is the slit grating 20 and one display unit corresponds to one subpixel, a period of the slit grating 20 may correspond to approximately two display units, and the opening portion 202 of the slit grating 20 may, for example, correspond to the first display unit 101, so that the viewer at the middle visual area 303 can see the third image displayed by the plurality of first display units 101 and the viewers at the left visual area 301 and the right visual area 302 can see the fourth image displayed by the plurality of second display units 102.

The display device includes two reflective plates 50, which are arranged outside an edge of the display panel 10 adjacent to the left visual area 301 and outside an edge of the display panel 10 adjacent to the right visual area 302, respectively, and configured to reflect the fourth image displayed at the left visual area 301 and the right visual area 302, respectively, to the middle visual area 303.

In this case, if the images are viewed from left to right, it is merely required to ensure the viewer at the middle visual area 303 to see a middle portion of the complete image from the middle visual area 303, and to see a left portion and a right portion of the complete image from the two reflective plates 50 adjacent to the left visual area 301 and the right visual area 302, thereby to achieve the wide-screen display.

The viewer at the middle visual area 303 see the identical fourth image from the two reflective plates 50 adjacent to the left visual area 301 and the right visual area 302, so the viewer can see a complete, clear image only when he sees a right portion of a mirror image of the fourth image from the reflective plate adjacent to the left visual area 301 and a left portion of the mirror image of the fourth image from the reflective plate adjacent to the right visual area 302. Hence, the viewer is able to see parts of the mirror image of the fourth image from the two reflective plates respectively by controlling a height of the reflective plate and a position of the viewed at the middle visual area, thereby to see a clear image.

The structure of the display device capable of achieving the wide-screen display and the principle thereof will be described in Example 2 according to an embodiment of the present invention, where the viewer located at the middle visual area 303 can see the image as shown in FIG. 3*a*.

Referring to FIG. 4, the display device comprises the display panel 10, the driving module 40 coupled to the display panel 10, the slit grating 20 arranged at the light-exiting side of the display panel 10, and two reflective plates 50 arranged outside an edge of the display panel 10 adjacent to the right visual area 302 and outside an edge of the display panel 10 adjacent to the left visual area 301, respectively.

The display panel 10 includes a plurality of first display units 101 and a plurality of second display units 102, the plurality of first display units 101 and the plurality of second display units 102 are periodically arranged at a regular interval. Here, one display unit corresponds to one subpixel.

The driving module 40 is specifically configured to drive the plurality of first display units 101 of the display panel 10 to drive a third image and drive the plurality of second display units 102 of the display panel 10 to display a fourth image.

The slit grating 20 is configured to display the third image at the middle visual area 303 and display the fourth image at the left visual area 301 and the right visual area 302.

To be specific, a period of the slit grating 20 may correspond to approximately two display units, and the opening portion 202 of the slit grating 20 may, for example, correspond to the first display unit 101, so that the viewer at the middle visual area 303 can see the third image display by the plurality of first display units 101, and the viewers at the left visual area 301 and the right visual area 302 can see the fourth image displayed by the plurality of second display units 102.

Figure 5A:
FIG. 5a is a view showing an image seen by a viewer, located at a middle visual area, from the respective plate adjacent to the left visual area of the display device in Example 2 according to an embodiment of the present invention.
Figure 5B:
FIG. 5b is a view showing an image seen by the viewer, located at the middle visual area, from the middle visual area of the display device in Example 2 according to an embodiment of the present invention.
Figure 5C:
FIG. 5c is a view showing an image seen by the viewer, located at the middle visual area, from the reflective plate adjacent to the right visual area of the display device in Example 2 according to an embodiment of the present invention.

In this case, the viewer at the middle visual area 303 see, in an order from left to right, Chinese characters "天", "下为" and "公" as shown in FIGS. 5*a*, 5*b* and 5*c* from the reflective plate 50 adjacent to the left visual area 301, the middle visual area 303 and the reflective plate 50 adjacent to the right visual are 302 sequentially, thereby the wide-screen display is achieved. In other words, during the display, it is required to ensure the viewer can at least see Chinese character "天" from the reflective plate adjacent to the left visual area 301, see Chinese characters "下为" from the middle visual area 303, and see Chinese character "公" from the reflective plate adjacent to the right visual area 302. However, the identical image is displayed at the left visual area 301 and the right visual area 302, and the complete image, i.e., "天下为公", will be seen only when the viewer at the middle visual area 303 sees "天", which is close to the middle visual area 303, from the reflective plate adjacent to the left visual area 301, and sees "公", which is close to the middle visual area 303, from the reflective plate adjacent to the right visual area 302. Hence, according to the mirror image theory, the fourth image displayed at the left visual area 301 needs to include a mirror image of "天", the fourth image displayed at the right visual area 302 needs to include a mirror image of "公", and it is required to ensure that "天" seen from the reflective plate 50 adjacent to the left visual area 301 is close to the middle visual area 303. Correspondingly, the mirror image of "天" displayed at the left visual area 301 shall be away from the middle visual area 303. Similarly, it is required to ensure that "公" seen from the reflective plate 50 adjacent to the right visual area 302 is close to the middle visual are 303, and correspondingly the mirror image of "公" displayed at the right visual area 302 shall be away from the middle visual area 303. As a result, in the case that the identical image is displayed at the left visual area 301 and the right visual area 302, the images as shown in FIG. 5*d*, i.e., the mirror images of "天" and "公", shall be displayed.

Figure 5D:
FIG. 5d is a view showing an image actually shown at the left and right visual areas of the display device in Example 2 according to an embodiment of the present invention.
Figure 5E:
FIG. 5e is a view showing an image that may be seen by the viewer, located at the middle visual area, from the reflective plate adjacent to the left visual area, the middle visual area and the reflective plate adjacent to the right visual area of the display device in Example 2 according to an embodiment of the present invention.

Based upon the above, the third image is just "下为" as shown in FIG. 5*b*, and the fourth images are just the mirror images of "天" and "公" as shown in FIG. 5*d*. Further, the viewer at the middle visual area 303 is prevented from seeing the image as shown in FIG. 5*e* by controlling a height of the reflective plate 50 and a position of the viewer at the middle visual area 303.

Figure 6:
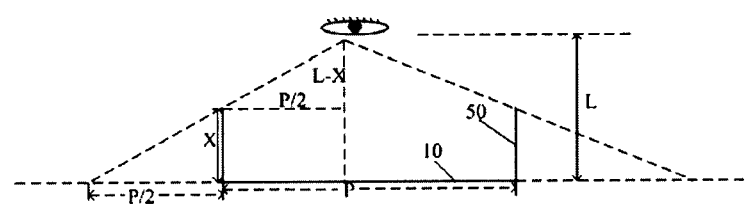
FIG. 6 is a schematic view showing a height of the reflective plate of the display device and a distance from the viewer to the reflective plate according to an embodiment of the present invention.

As shown in FIG. 6, for example, the viewer may control the height of the reflective plate 50 and his position so as to merely see a half of the mirror image of the fourth image from the reflective plate adjacent to the left visual area 301. The relationship between the height of the reflective plate and the position of the viewer may be calculated through the following equation.

It is presumed that the length of the display panel is P, the distance from the viewer to the display panel is L, and the height of the reflective plate is X. Because the viewer wants merely to see a half of the image from the reflective plate, it is equivalent to extending the screen by a half of the length of the display panel toward a side of the reflective plate away from the display panel. According to the homothetic triangle theory, the equation $$\frac{L}{P} = \frac{L-X}{P/2}$$

will be obtained, i.e., X=L/2. Hence, the viewer at the middle visual area 303 can see the complete, clear image as shown in FIG. 3a by appropriately setting the height of the reflective plate 50 according to an optimal viewing distance (i.e., a half of the optimal viewing distance).

Based upon the above, in the example, the driving module 40 is configured to drive the plurality of first display units 101 of the display panel 10 to display the third image, i.e., "下为" as shown in FIG. 5b, and drive the plurality of second display units 102 of the display panel 10 to display the fourth images, i.e., the mirror images of "天" and "公" as shown in FIG. 5d.

It is to be noted that, the way of how to divide, by the driving module 40, a complete image into two parts, thereby to display a middle part of the image by the first display unit 101, combine the mirror images of the other two parts and display them by the second display unit 102 will not be defined herein, and it may be set arbitrarily according to the actual situation.

Figure 7:
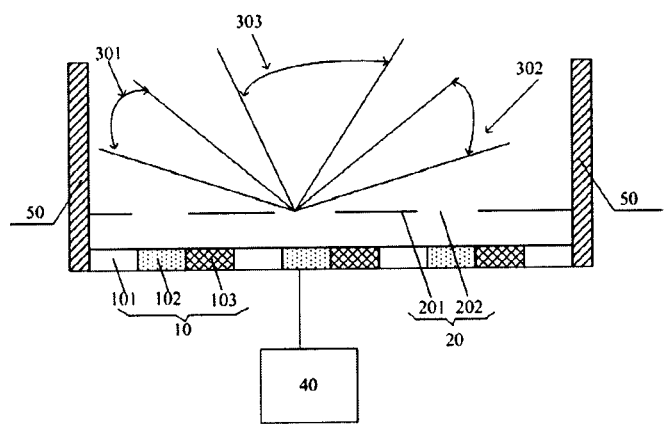
FIG. 7 is a third schematic view showing the display device according to an embodiment of the present invention.

Alternatively, as shown in FIG. 7, the display panel 10 includes the plurality of first display units 101, the plurality of second display units 102, and a plurality of third display units 103 arranged sequentially and circularly.

The driving module 40 is configured to drive the plurality of first display units 101 of the display panel 10 to display a fifth image, drive the plurality of second display units 102 of the display panel 10 to display a sixth image, and drive the plurality of third display units 103 of the display panel 10 to display a seventh image.

The parallax baffle is configured to display the fifth image at the middle visual area 303, display the sixth image at the left visual area 301 and display the seventh image at the right visual area 302.

Here, when the parallax baffle is the slit grating 20 and one display unit corresponds one subpixel, the period of the slit grating 20 may correspond to three display units, so that the viewer at the middle visual area 303 can see the fifth image displayed by the plurality of first display units 101, the viewer at the left visual area 301 can see the sixth view displayed by the plurality of second display units 102, and the viewer at the right visual area 302 can see the seventh image displayed by the plurality of third display units 103.

The display device includes two reflective plates 50, which are arranged outside an edge of the display panel 10 adjacent to the left visual area 301 and outside an edge of the display panel 10 adjacent to the right visual area 302, and configured to reflect the sixth image displayed at the left visual area 301 and the seventh image displayed at the right visual area 302 to the middle visual area 303, respectively.

The fifth image displayed at the middle visual area, and the mirror images of the sixth image and the seventh image reflected by the reflective plates 50 adjacent to the left visual area 301 and the right visual area 302 to the middle visual area form a complete image.

The fifth, sixth and seventh images seen by the viewers at the middle visual area 303, the left visual area 301 and the right visual area 302 are displayed at the whole display panel. When the viewer at the middle visual area not only can see the fifth image displayed at the whole display panel from the middle visual area but also can see the sixth and seventh images displayed at the whole display panel that should have merely been seen from the left visual area 301 and the right visual area 302, and when the mirror images of the sixth, fifth and seventh images, in an order from left to right, form the complete image, the viewer at the middle visual area 303 will see the complete, clear image from a screen with a size triple a size of the display panel. As a result, it is able to achieve the wide-screen display.

The structure of the display device capable of achieving the wide-screen display and the principle thereof will be described in Example 3 according to an embodiment of the present invention, where the viewer located at the middle visual area 303 can see the image as shown in FIG. 3a.

Referring to FIG. 7, the display device comprises the display panel 10, the driving module 40 coupled to the display panel 10, the slit grating 20 arranged at the light-exiting side of the display panel 10, and two reflective plates 50 arranged outside an edge of the display panel 10 adjacent to the right visual area 302 and outside an edge of the display panel 10 adjacent to the left visual area 301, respectively.

The display panel 10 includes the plurality of first display units 101, the plurality of second display units 102 and the plurality of third display units 103, and the plurality of first display units 101, the plurality of second display units 102 and the plurality of third display units 103 are arranged sequentially and circularly. Here, one display unit corresponds to one subpixel.

The driving module 40 is configured to drive the plurality of first display units 101 of the display panel 10 to display the fifth image, drive the plurality of second display units 102 of the display panel 10 to display the sixth image, and drive the plurality of third display units 103 of the display panel 10 to display the seventh image.

The slit grating 20 is configured to display the fifth image at the middle visual area 303, display the sixth image at the left visual area 301, and display the seventh image at the right visual area 302.

To be specific, the period of the slit grating 20 may correspond to approximately three display units, and a center line of the opening portion 202 of the slit grating 20 may substantially coincide with a center line of a set of display units, so that the viewer at the middle visual area 303 can see the fifth image displayed by the plurality of first display units 101, the viewer at the left visual area 301 can see the sixth image displayed by the plurality of second display units 102, and the viewer at the right visual area 302 can see the seventh image displayed by the plurality of third display units 103.

The set of display units consist of one first display unit 101, one second display unit 102 and one third display unit 103 arranged sequentially. It is to be noted that, the center line of the opening portion 202 of the slit grating 20 does not coincides absolutely with the center line of the set of display units, and there may be a deviation therebetween.

In this case, the viewer at the middle visual area 303 will see, in an order from left to right, "天", "下为" and "公" as shown in FIGS. 5a, 5b and 5c from the reflective plate 50 adjacent to the left visual area 301, the middle visual area 302 and the reflective plate 50 adjacent to the right visual area 302 sequentially, thereby the wide-screen display can be achieved. Hence, the fifth image may be displayed as "下为" as shown in FIG. 5b, the sixth image may be displayed as the mirror image of "天" as shown in FIG. 5a, and the seventh image may be displayed as the mirror image of "公" as shown in FIG. 5c.

Based upon the above, in the example, the driving module 40 is specifically configured to drive the plurality of first display units 101 of the display panel 10 to display the fifth image, i.e., "卜为" as shown in FIG. 5b, drive the plurality of second display units 102 of the display panel 10 to display the sixth image, i.e., the mirror image of "天", and drive the plurality of third display units 103 of the display panel 10 to display the seventh image, i.e., the mirror image of "公".

It is to be noted that, the way of how to divide, by the driving module 40, a complete image into two parts, thereby to display a middle part of the image by the first display unit 101, and display the mirror images of the other two parts by the second display unit 102 and the third display unit 103 will not be defined herein, and it may be set arbitrarily according to the actual situation.

In the above-mentioned possible display devices, preferably the reflective plate 50 is vertically arranged outside at least one edge of the display panel 10, so that the image seen by the viewer from the visual area where the viewer is located is on an identical plane to the image seen from the reflective plate.

Alternatively, the display panel 10 may be a liquid crystal display panel.

In this case, the display device may further comprise a backlight source.

Of course, the display panel 10 may also be an OLED display panel.

It is to be noted that, regardless of the forms of the display panel 10, the display panel may be any product or member having a display function, such as a mobile phone, a tablet PC, a TV, a display, a laptop PC, a digital photo frame and a navigator.

The above are merely the preferred embodiments of the present invention, but the scope of the present invention is not limited thereto. A person skilled in the art may further make substitutions or modifications without departing from the principle of the present invention, and these substitutions or modifications shall also be considered as falling within the scope of the present invention. Hence, the scope of the present invention shall be subject to the appended claims.

What is claimed is:

1. A display device, comprising a display panel and a driving circuit coupled to the display panel, the display device further comprises:
   a parallax baffle arranged at a light-entering side or a light-exiting side of the display panel, and
   at least one reflective plate arranged outside at least one edge of the display panel,
   wherein the display panel comprises a plurality of display units,
   the driving circuit is configured to drive the plurality of display units of the display panel to display a plurality of images,
   the parallax baffle is configured to display the plurality of images displayed by the plurality of display units at a plurality of predetermined visual areas, respectively, and
   the at least one reflective plate is configured to reflect the image displayed at the visual area adjacent to the reflective plate to other predetermined visual area.

2. The display device according to claim 1, wherein the plurality of display units comprise a plurality of first display units and a plurality of second display units, the plurality of first display units and the plurality of second display units are periodically arranged at a regular interval,
   the driving circuit is configured to drive the plurality of first display units of the display panel to display a first image and drive the plurality of second display units of the display panel to display a second image,
   the parallax baffle is configured to display the first image at a left visual area and display the second image at a right visual area,
   the display device comprises merely one reflective plate, which is arranged outside an edge of the display panel adjacent to the right visual area and configured to reflect the second image displayed at the right visual area to the left visual area, and
   the first image displayed at the left visual area and a mirror image of the second image reflected to the left visual area form a complete image.

3. The display device according to claim 2, wherein the parallax baffle is a slit grating.

4. The display device according to claim 1, wherein
   the plurality of display units comprise a plurality of first display units and a plurality of second display units, the plurality of first display units and the plurality of second display units are periodically arranged at a regular interval,
   the driving circuit is configured to drive the plurality of first display units of the display panel to display a first image and drive the plurality of second display units of the display panel to display a second image,
   the parallax baffle is configured to display the first image at a left visual area and display the second image at a right visual area,
   the display device comprises merely one reflective plate, which is arranged outside an edge of the display panel adjacent to the left visual area and configured to reflect the first image displayed at the left visual area to the right visual area, and
   the second image displayed at the right visual area and a mirror image of the first image reflected to the right visual area form a complete image.

5. The display device according to claim 4, when one display unit corresponds to one subpixel, a period of the slit grating corresponds to approximately two display units, and the opening portion of the slit grating corresponds to a junction, or a position in the vicinity thereof, between the first display unit and the second display unit.

6. The display device according to claim 4, wherein the parallax baffle is a slit grating.

7. The display device according to claim 6, when one display unit corresponds to one subpixel, the period of the slit grating corresponds to approximately two display units, and the opening portion of the slit grating corresponds to the junction, and a position in the vicinity thereof, between the first display unit and the second display unit.

8. The display device according to claim 1, wherein
   the plurality of display units comprise a plurality of first display units and a plurality of second display units, the plurality of first display units and the plurality of second display units are periodically arranged at a regular interval,
   the driving circuit is configured to drive the plurality of first display units of the display panel to display a third image and drive the plurality of second display units of the display panel to display a fourth image, the parallax baffle is configured to display the third image at a middle visual area, and display the fourth image at a left visual area and a right visual area, respectively, the display device comprises two reflective plates, which are arranged outside an edge of the display panel adjacent to the left visual area and outside an edge of the display panel adjacent to the right visual area, respectively, and configured to reflect the fourth image displayed at the left visual area and the right visual area, respectively, to the middle visual area, and the third image displayed at the middle visual area and at least a part of a mirror image of the fourth image reflected from the reflective plates adjacent to the left visual area and the right visual area to the middle visual area form a complete image.

9. The display device according to claim 8, wherein the parallax baffle is a slit grating.

10. The display device according to claim 9, when one display unit corresponds to one subpixel, a period of the slit grating corresponds to approximately two display units, and the opening portion of the slit grating corresponds to one display unit.

11. The display device according to claim 1, wherein the plurality of display units comprise a plurality of first display units, a plurality of second display units and a plurality of third display units, the plurality of first display units, the plurality of second display units and the plurality of third display units are arranged sequentially and circularly, the driving circuit is configured to drive the plurality of first play units of the display panel to display a fifth image, drive the plurality of second display units of the display panel to display a sixth image, and drive the plurality of third display units of the display panel to display a seventh image, the parallax baffle is configured to display the fifth image at a middle visual area, display the sixth image at a left visual area, and display the seventh image at a right visual area, the display device comprises two reflective plates, which are arranged outside an edge of the display panel adjacent to the left visual area and outside an edge of the display panel adjacent to the right visual area, and configured to reflect the sixth image displayed at the left visual area and the seventh image displayed at the right visual area to the middle visual area, respectively, and the fifth image displayed at the middle visual area, a mirror image of the sixth image and a mirror image of the seventh image which are reflected from the reflective plates adjacent to the left visual area and the right visual area to the middle visual area, respectively, form a complete image.

12. The display device according to claim 11, wherein the parallax baffle is a slit grating.

13. The display device according to claim 12, wherein a period of the slit grating corresponds to three display units and a center line of the opening portion of the slit grating substantially coincides with a center line of a set of display units.

14. The display device according to claim 1, wherein the reflective plate is vertically arranged outside at least one edge of the display device.

15. The display device according to claim 1, wherein the display panel is a liquid crystal display panel.

16. The display device according to claim 15, further comprising a backlight source.

17. The display device according to claim 1, wherein the display panel is an OLED display panel.

18. The display device according to claim 1, wherein the parallax baffle is a liquid crystal grating or a grating made of an electrochromic material.

19. A display device, comprising a display panel and a driving module coupled to the display panel, the display device further comprises:

a parallax baffle arranged at a light-entering side or a light-exiting side of the display panel, and at least one reflective plate arranged outside at least one edge of the display panel, wherein the display panel comprises a plurality of display units, the driving module is configured to provide signals corresponding to a plurality of images to the display units of the display panel to display a plurality of images, the parallax baffle is configured to display the plurality of images displayed by the plurality of display units at a plurality of predetermined visual areas, respectively, and the at least one reflective plate is configured to reflect the image displayed at the visual area adjacent to the reflective plate to other predetermined visual area.

* * * * *